United States Patent
Chang et al.

(10) Patent No.: US 12,125,202 B2
(45) Date of Patent: Oct. 22, 2024

(54) METHOD FOR PROMPTING EFFICIENT COLLECTION OF CELLS FROM CULTURE VESSELS AND SYSTEM APPLYING THE METHOD

(71) Applicant: HON HAI PRECISION INDUSTRY CO., LTD., New Taipei (TW)

(72) Inventors: Yueh Chang, New Taipei (TW); Chin-Pin Kuo, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 414 days.

(21) Appl. No.: 17/748,293

(22) Filed: May 19, 2022

(65) Prior Publication Data

US 2023/0085678 A1    Mar. 23, 2023

(30) Foreign Application Priority Data

Sep. 23, 2021 (CN) .......................... 202111116558.2

(51) Int. Cl.
*G06N 3/045* (2023.01)
*G06T 7/00* (2017.01)

(52) U.S. Cl.
CPC ........... *G06T 7/0012* (2013.01); *G06N 3/045* (2023.01); *G06T 2207/20081* (2013.01); *G06T 2207/30242* (2013.01)

(58) Field of Classification Search
CPC ......... G06T 7/0012; G06T 2207/20081; G06T 2207/30242; G06T 2207/10056; G06T 2207/20084; G06T 2207/30024; G06N 3/045
See application file for complete search history.

(56) References Cited

U.S. PATENT DOCUMENTS

2021/0031144 A1*  2/2021  Belgrader .............. C12N 15/00
2021/0054330 A1*  2/2021  Takahara ................ C12Q 3/00

* cited by examiner

*Primary Examiner* — Emily C Terrell
*Assistant Examiner* — Ahmed A Nasher
(74) *Attorney, Agent, or Firm* — ScienBiziP, P.C.

(57) ABSTRACT

In a method for promoting timely collection of cells being cultured in a vessel, image of the vessel and contents is obtained. A cell counting result, a sum of areas of unoccupied background regions, and a sum of area of cell-occupied regions are obtained based on the image. A specified cell collection range is obtained based on expected culturing time. A collection promoting instruction is generated when the cell counting result is in the specified cell collection range or when the sum of areas of unoccupied background regions is less than the specified cell collection area threshold value. A system applying the method is also provided.

16 Claims, 3 Drawing Sheets

METHOD FOR PROMPTING EFFICIENT COLLECTION OF CELLS FROM CULTURE VESSELS AND SYSTEM APPLYING THE METHOD

FIELD

The subject matter herein generally relates to image identification, particularly to cell statistics, a method for promoting cell collection and a system applying the method.

BACKGROUND

Cell culturing forms a plurality of cells and studies the formed cells, such as signal transmission between the formed cells, metabolism and anabolism of the formed cells, and growth and proliferation of the formed cells. A vessel, such as a culture dish, has an upper limit in regard to a number of cells while culturing cells. When the number of the contained cells reaches the upper limit, a division speed of the cell slows down, or the cells start to die. Thus, the cells need to be collected at certain times to avoid such occurrences.

Thus, there is room for improvement in the art.

BRIEF DESCRIPTION OF THE DRAWINGS

Implementations of the present disclosure will now be described, by way of example only, with reference to the attached figures.

DETAILED DESCRIPTION

Figure 1:
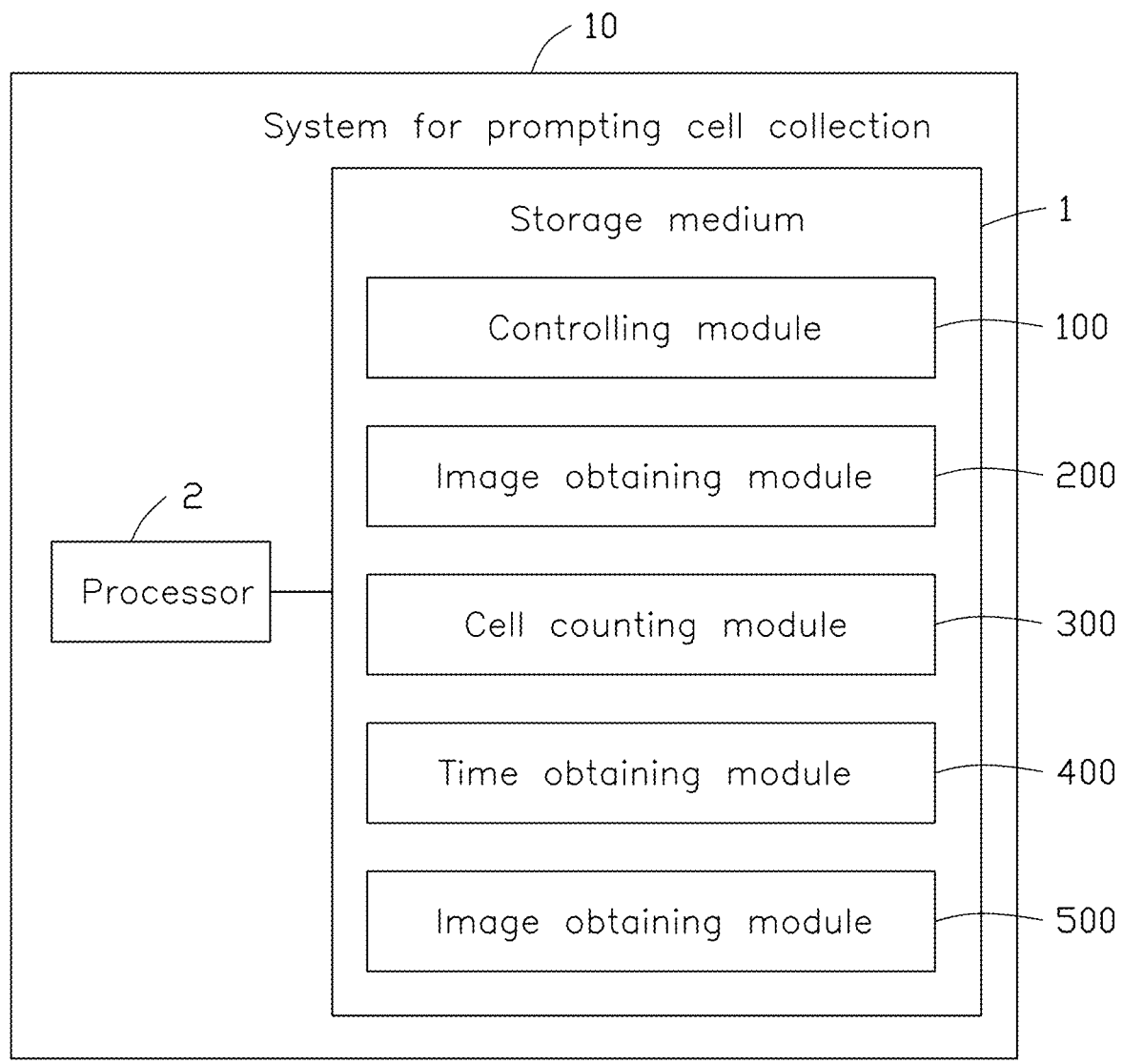
FIG. 1 is a diagram illustrating an embodiment of a system for promoting cell collection according to the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

The term "comprising" means "including, but not necessarily limited to"; it specifically indicates open-ended inclusion or membership in a so-described combination, group, series, and the like. The disclosure is illustrated by way of example and not by way of limitation in the figures of the accompanying drawings in which like references indicate similar elements. It should be noted that references to "an" or "one" embodiment in this disclosure are not necessarily to the same embodiment, and such references can mean "at least one."

As used in this application, the terms "environment," "system," "engine," "module," "component," "architecture," "interface," "unit," and the like refer to a computer-related entity or an entity related to an operational apparatus with one or more defined functionalities. The terms "environment," "system," "engine," "module," "component," "architecture," "interface," and "unit" can be utilized interchangeably and can be generically referred to functional elements. Such entities may be either hardware, a combination of hardware and software, software, or software in execution. As an example, a module can be embodied in a process running on a processor, a processor, an object, an executable portion of software, a thread of execution, a program, and/or a computing device. As another example, both a software application executing on a computing device and the computing device can embody a module. As yet another example, one or more modules may reside within a process and/or thread of execution. A module may be localized on one computing device or distributed between two or more computing devices. As is disclosed herein, a module can execute from various computer-readable non-transitory storage media having various data structures stored thereon. Modules can communicate via local and/or remote processes in accordance, for example, with a signal (either analog or digital) having one or more data packets (e.g., data from one component interacting with another component in a local system, distributed system, and/or across a network such as a wide area network with other systems via the signal).

A vessel, such as a culture dish, has an upper limit regarding the number of cells contained within during a culture. When the number of the contained cells reaches the upper limit, a division speed of the cell slows down, or the cells die. Thus, the cells need to be collected at certain times.

Thus, the present disclosure provides a system and a method for promoting cell collection. The system and the method can determine whether cells need to be collected based on a size of area of the background and a number of the cells in a vessel. When the cells need to be collected, a collecting promoting instruction is generated for advising personnel to collect the cells in the vessel.

FIG. 1 shows a system 10 for promoting cell collection. As shown in FIG. 1, the system 10 includes a storage medium 1 and a processor 2. The storage medium 1 stores program codes. The storage medium 1 can be non-physical storage circuits in an embedded circuit, or a physical storage, such as a memory, a transflash card, a smart media card, a secure digital card, a flash card, and so on. The processor 2 can include one or more microprocessors and digital processors. The processor 2 can invoke program codes in the storage medium 1 to execute corresponding function. For example, the modules in the FIG. 1 are program codes stored in the storage medium 1, and can be executed by the processor 2, for implementing a data read/write processing method. The processor 2 is a central processing unit, which is a large scale integrated circuit. The storage medium 1 includes a controlling module 100, an image obtaining module 200, a cell counting module 300, a time obtaining module 400, and an image dividing module 500.

In one embodiment, the image obtaining module 200 is configured to obtain an image of cell content of a vessel (image information). The image information includes an image of the vessel and cells in the vessel. It is understood that the image obtaining module 200 can be a camera disposed upon the vessel or disposed upon a microscope for achieving a clear image information. For example, the camera can be a High-Definition (HD) camera. In the image information, the cells which are imaged (cell images) can be distinguished.

For example, the image obtaining module 200 also captures a static image or video. The images of the cells and the vessel can be projected on a photosensitive element. The photosensitive element can be a charge coupled device (CCD) or a complementary metal-oxide-semiconductor (CMOS). In some embodiments, the image obtaining module 200 can include one or N cameras, N being a positive integer.

It is understood that, the cell counting module 300 includes a feature extracting sub-module 301 and a cell counting sub-module 302. The feature extracting sub-module 301 is configured to extract features of cells in the image information in the vessel to form the cell images. The cell counting sub-module 302 is configured to count a number of the cells based on the cell images divided by the feature extracting sub-module 301 and output a cell counting result to the controlling module 100.

For example, the feature extracting sub-module 301 can include convolutional neural network (CNN) models, such as a visual geometry group (VGG) model, a MobileNet model, a ResNet model, not being limited. The model used in the feature extracting sub-module 301 can be adjusted based on hardware of the system 10. The CNN model can automatically extract features of the cells for accurately identifying cells by their outlines.

Before extracting features by the feature extracting sub-module 301, the feature extracting sub-module 301 can use a single shot multibox detection (SSD) model for framing the cells. The outline of each cell can be accurately identified by using the SSD model. After framing the outlines of the cells, the features of the cells are accurately extracted, and mis-extraction of the features of the vessel by the CNN model is avoided.

The time obtaining module 400 can include a time sequence sub-module 401. The time sequence sub-module 401 is configured to obtain a culturing time and compute several cell number ranges based on the culturing time. The time sequence sub-module 401 can use a recurrent neural network (RNN) model for determining a growth time and the cell number ranges corresponding to the growth time. For example, the time sequence sub-module 401 also can use a special RNN model, such as a long short-term memory (LSTM) model for determining the cell number range.

A theoretical division speed of the cells (speed of cell growth in the vessel) can be indexed, but in fact the division speed of the cells is affected by other factors (such as a lack of nutrient and a lack of space) although the division speed of the cells still increases over time. Thus, when the controlling module 100 controls the image obtaining module 200 to obtain the image information, a frequency of the image obtaining module 200 for obtaining the image information becomes higher. For example, interval times for obtaining the image information can be set as 30 minutes, 30 minutes, 20 minutes, 20 minutes, 10 minutes, 10 minutes, and 5 minutes or other period.

When the cell counting result is in the cell number range corresponding to the current culturing time, the time sequency sub-module 40 outputs the cell number range to the controlling module 100. The controlling module 100 compares the cell counting result transmitted by the cell counting module 300 with the cell number range. When the cell counting result exceeds a maximum value of the cell number range or in the cell number range, the cell culture in the vessel is good. The controlling module 100 further determines whether the cell counting result is in a specified cell collection range. When the cell counting result is in the specified cell collection range, the controlling module 100 generates a collection promoting instruction for promoting a collection of the cells in the vessel. When the cell counting result is below a minimum value of the cell number range, the culture in the vessel is proceeding abnormally, the controlling module 100 generates an abnormal instruction for warning personnel as to the abnormality, a suitable process needs to be invoked for reducing potential loss.

The image dividing module 500 is configured to divide the cells from a background based on the image information provided by the feature extracting sub-module 301. For example, the image dividing module 500 may use a fully convolutional networks (FCN) model or a UNet model similar with the FCN for dividing images.

For example, the image dividing module 500 divides the image information to obtain cell regions and background regions when receiving the image information. The image dividing module 500 further computes a ratio between a sum of areas of the background regions and a sum of areas of all the cell regions. When the ratio between the sum of the areas of the background regions and the sum of the areas of the cell regions is larger than a specified ratio threshold value, a promoting or prompting signal is generated and outputted to the controlling module 100. The controlling module 100 generates the collection promoting instruction based on the promoting signal for promoting the collection of the cells in the vessel.

After dividing the cell regions and the background regions by the image dividing module 500, the image dividing module 500 further adds areas of the background regions to obtain the sum of the areas of the background regions and compares the sum of the areas of the background regions with a specified cell collection area threshold value. When the sum of the areas of the background regions reaches the specified cell collection area threshold value, the promoting signal is generated and outputted to the controlling module 100.

Figure 2A:
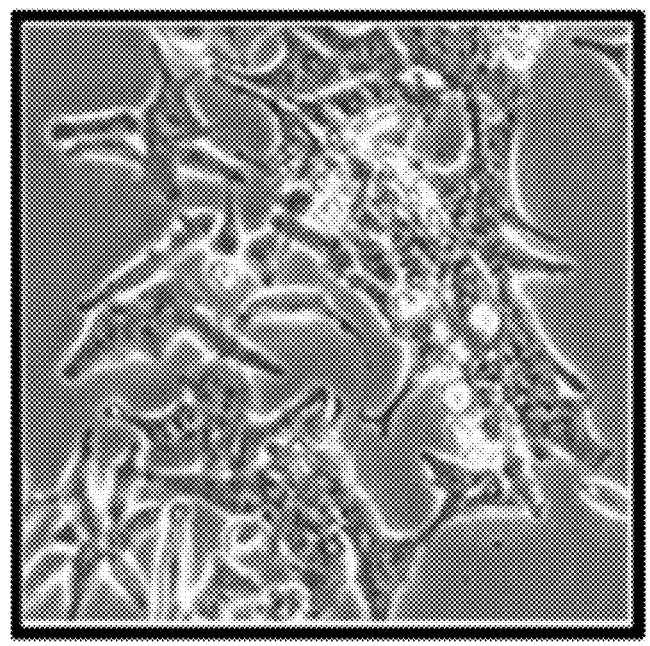
FIGS. 2A and 2B are diagrams illustrating embodiments of images with the cells before division and after division, respectively, according to the present disclosure.
Figure 2B:
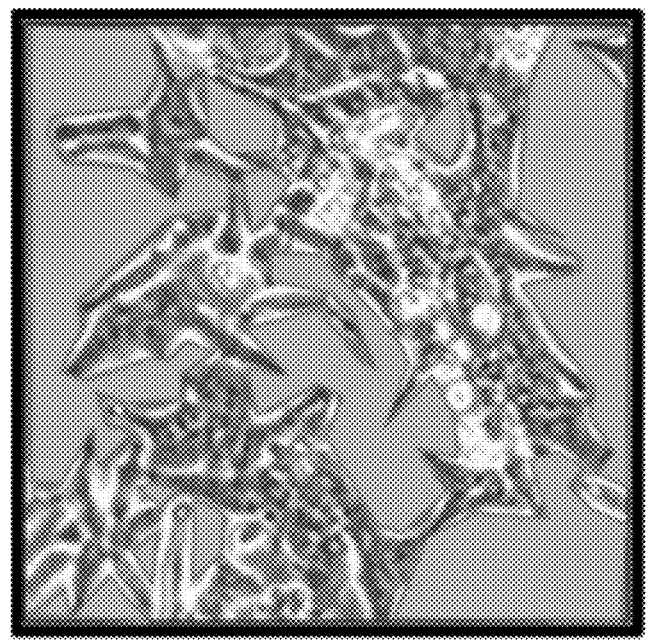

FIGS. 2A and 2B shows the images with the cells before division and cells after division together with their backgrounds. FIG. 2A is before division, FIG. 2B is after division.

As shown in FIG. 2B, the cell regions are clearly distinguishable from the background regions after being divided by the image dividing module 500. The controlling module 100 generates the collection promoting instruction based on the promoting signal generated by the image dividing module 500 for promoting the collection of the cells.

The controlling module 100 also can generate the collection promoting instruction for promoting the collection of the cells when the sum of the areas of the background regions is less than a specified cell collection area threshold value or the cell counting result is in the specified cell collection range.

The system 10 can also include a training module (not shown). The training module trains the system 10 for accurately identifying the cell counting result and the outlines of the cells.

In the present disclosure, the system can determine whether the cells need to be collected based on a sum of areas of the background regions or the cell counting result. When the cells need to be collected, the collection prompting instruction is generated for promoting the collection of the cells. The system 10 also can warn the operation persons when the cell counting result is abnormal for warning the operation persons to carry out a check.

Figure 3:
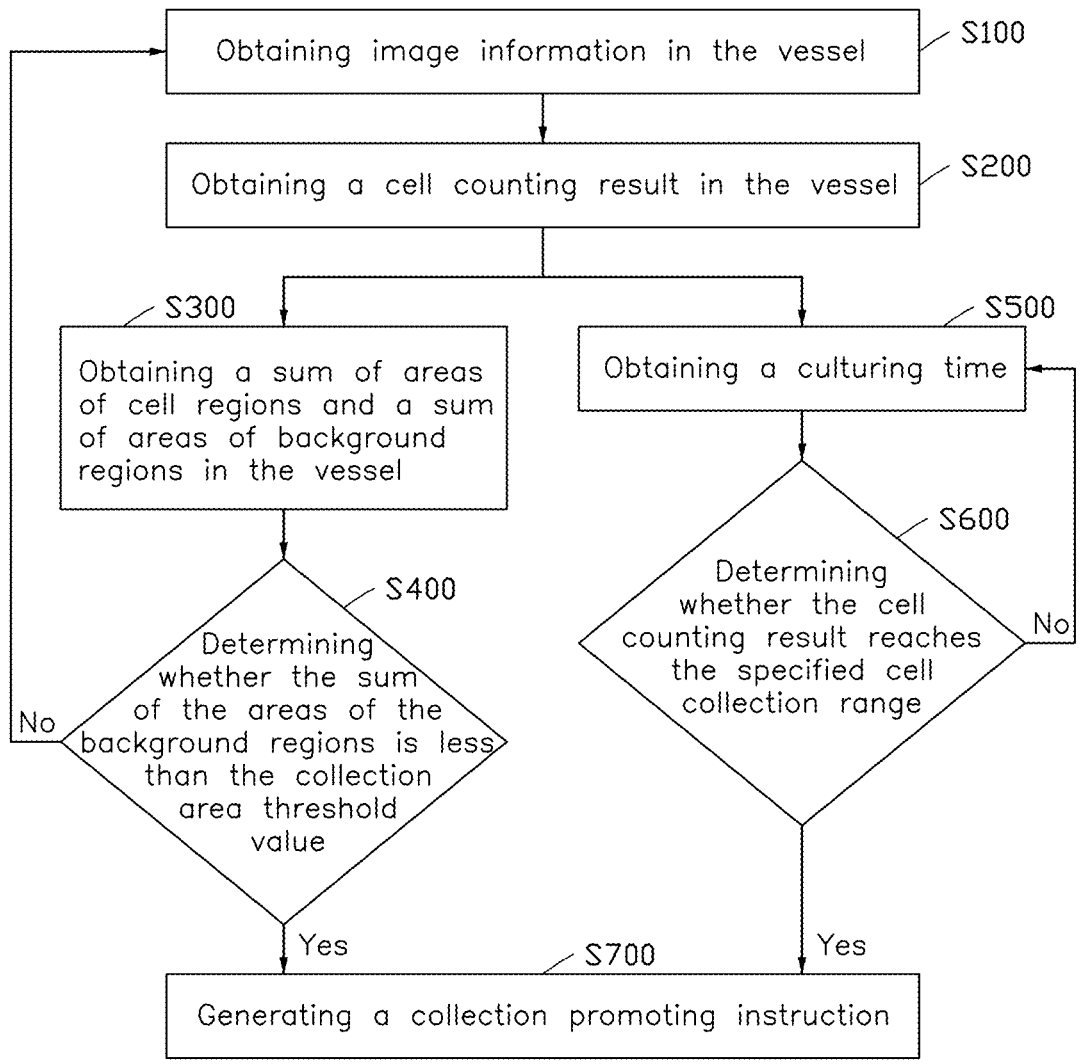
FIG. 3 is a flowchart illustrating an embodiment of method for promoting cell collection according to the present disclosure.

FIG. 3 is a flowchart of a method for promoting cell collection. As shown in FIG. 3, the method for promoting cell collection is used in the system 10 for promoting cell collection. The method includes the following steps, these steps may be re-ordered:

In block S100, image information in a vessel is obtained.

In the block S100, the image information is obtained by the image obtaining module 200. The manner of obtaining image information refers to the description of the image obtaining module 200 in FIG. 1.

In block S200, a cell counting result in the vessel is obtained.

In the block S200, the cell counting result is obtained by the cell counting module 300. The manner of obtaining cell counting result refers to the system 10 FIG. 1.

In block S300, a sum of areas of background regions and a sum of areas of cell regions in the vessel.

In the block S300, the sum of the areas of the background regions and the sum of the areas of the cell regions are obtained by the image dividing module 500. The obtaining manner of the sum of the areas of the background regions and the sum of the areas of the cell regions refers the system 10 in FIG. 1.

In block S400, whether the sum of the areas of the background regions is less than a collection area threshold value.

In the block 400, the operation for determining whether the sum of the areas of the background regions is less than the collection area threshold value is processed by the controlling module 100. The manner of making the determination refers the system 10 in FIG. 1.

In block S500, a cell culturing time is obtained.

In the block S500, the cell culture time is obtained by the time obtaining module 400. The obtaining manner of the cell culturing time refers to the system 10 in FIG. 1.

In block S600, whether the cell counting result reaches a specified cell collection range is determined.

In the block S600, the operation for determining whether the cell counting result reaches the specified cell collection range is calculated by the controlling module 100. The determining manner refers to the system 10 in FIG. 1.

In block S700, a collection promoting instruction is generated.

In the block S700, the collection promoting instruction is generated by the controlling module 100 for promoting cell collection. The manner of generating the collection promoting instruction refers the system 10 in FIG. 1.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system of promoting cell collection; the system comprises a non-transitory storage medium with program codes to form following modules; the modules comprises:
   an image obtaining module to obtain an image information in a vessel;
   a cell counting module to count a cell counting result in the vessel based on the image information in the vessel;
   a time obtaining module to obtain a cell culturing time and obtain a specified cell collection range based on the cell culturing time;
   an image dividing module to obtain a sum of areas of background regions and a sum of areas of cell regions based on the image information; and
   a controlling module to determine whether the sum of the areas of the background regions is less than a specified cell collection area threshold value;
   wherein if the sum of the areas of the background regions is less than the specified cell collection area threshold value or the cell counting result is in the specified cell collection range, a collection promoting instruction is generated by the controlling module.

2. The system of claim 1, wherein the cell counting module further comprises a feature extracting sub-module and a cell counting sub-module; the feature extracting sub-module extracts cell features in the image information in the vessel and divides the image information in the vessel based on the cell features to obtain cell images; the cell counting sub-module counts according to the cell images to obtain the cell counting result.

3. The system of claim 2, wherein the cell features are extracted by a visual geometry group, a MobileNet model, or a ResNet model of convolutional neural network models.

4. The system of claim 1, wherein the image dividing module divides the image information to obtain cell regions and background regions; the image dividing module adds areas of the background regions to obtain the sum of the areas of the background regions.

5. The system of claim 4, wherein the image information is divided by a fully convolutional networks model or a UNet model.

6. The system of claim 4, wherein the time obtaining module further computes several cell number ranges based on the culturing time; the controlling module further determines whether the cell counting result is in a corresponding cell number range; when the cell counting result is less than a minimum value of the corresponding cell number range, an abnormal instruction is generated for warning.

7. The system of claim 6, wherein the time obtaining module uses a recurrent neural network (RNN) model for determining growth times and the cell number ranges.

8. The system of claim 1, wherein the image dividing module further computes a ratio between the sum of the areas of the background regions and the sum of areas of cell regions; the image dividing module compares the ratio with a specified ratio threshold value; when the ratio is larger than the specified ratio threshold value; a promoting signal is generated and outputted to the controlling module; the controlling module generates the collection promoting instruction.

9. A method of promoting cell collection, used in a system; the system comprises a non-transitory storage medium with program codes, which when executed by a processor to implement the method; the method comprises:
   obtaining image information in a vessel;
   obtaining a cell counting result, a sum of areas of background regions, and a sum of areas of cell regions based on the image information;
   obtaining a culturing time in the vessel;
   obtaining a specified cell collection range based on the culturing time;
   determining whether the cell counting result is in the specified cell collection range;

determining whether the sum of the areas of the background regions is less than a specified cell collection area threshold value; and generating a collection promoting instruction when the cell counting result is in the specified cell collection range or the sum of the areas of the background region is less than the specified cell collection area threshold value.

10. The method of claim 9, wherein the step of obtaining a cell counting result, a sum of areas of background regions, and a sum of areas of cell regions based on the image information comprises:

extracting cell features in the image information in the vessel;

dividing the image information in the vessel based on the cell features to obtain cell images; and counting according to the cell images to obtain the cell counting result.

11. The method of claim 10, wherein the cell features are extracted by a visual geometry group, a MobileNet model, or a ResNet model of convolutional neural network models.

12. The method of claim 9, wherein the method further comprises:

dividing the image information to obtain cell regions and background regions; and adding areas of the background regions to obtain the sum of the areas of the background regions.

13. The method of claim 12, wherein the image information is divided by a fully convolutional networks model or a UNet model.

14. The method of claim 9, wherein the method further comprises:

computing several cell number ranges based on the culturing time;

determining whether the cell counting result is in a corresponding cell number range; and generating an abnormal instruction for warning.

15. The method of claim 14, wherein a recurrent neural network (RNN) model is used for determining growth times and the cell number ranges.

16. The method of claim 9, wherein the method further comprises:

computing a ratio between the sum of the areas of the background regions and the sum of the areas of cell regions;

determining whether the ratio is larger than a specified ratio threshold value;

generating a promoting signal; and generating the collection promoting instruction based on the promoting signal.

* * * * *